N. P. OLSON.
METALLIC BUILDING CONSTRUCTION.
APPLICATION FILED APR. 21, 1914. RENEWED APR. 4, 1918.
1,284,758.
Patented Nov. 12, 1918.
3 SHEETS—SHEET 3.
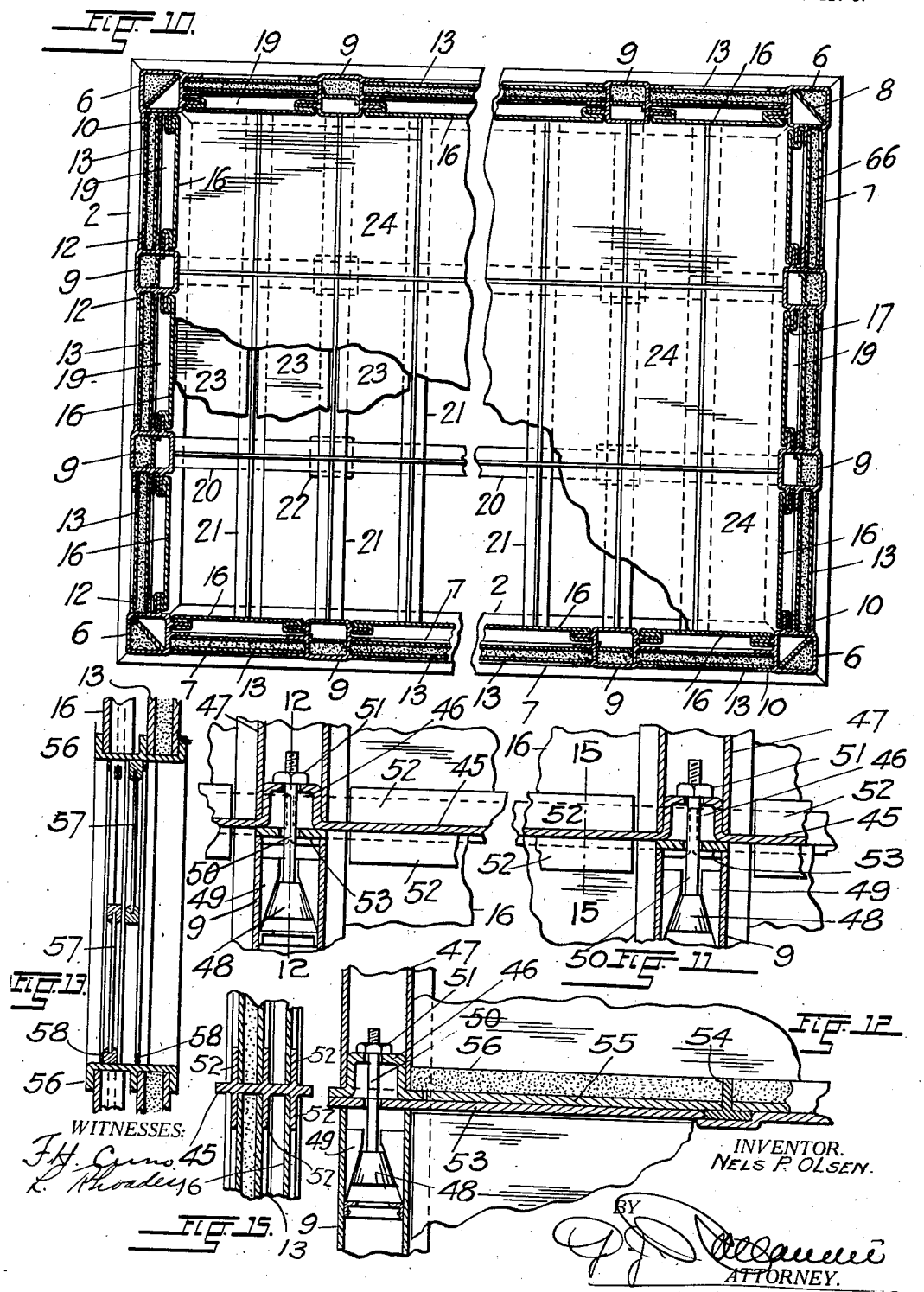
INVENTOR.
NELS P. OLSEN.

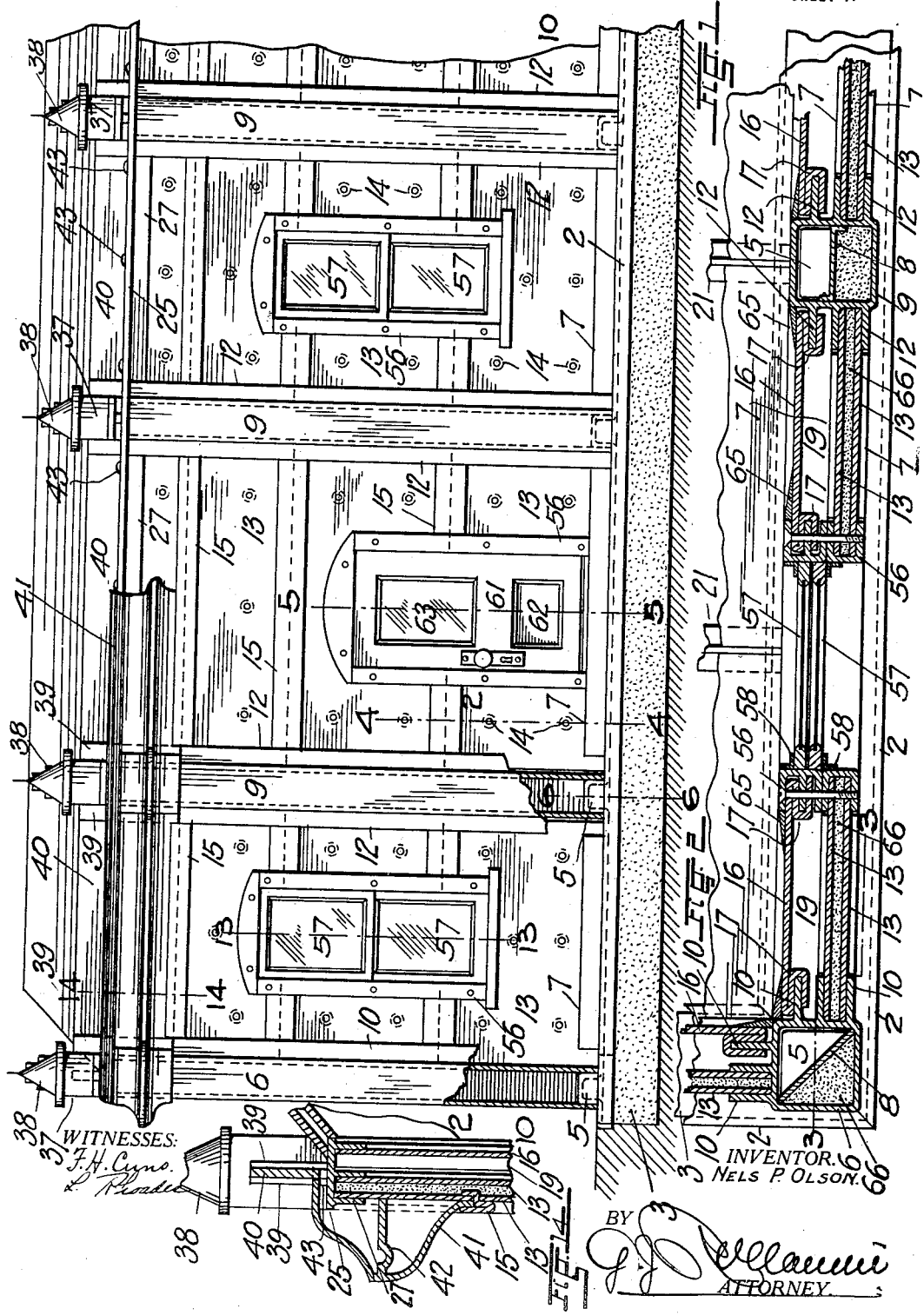

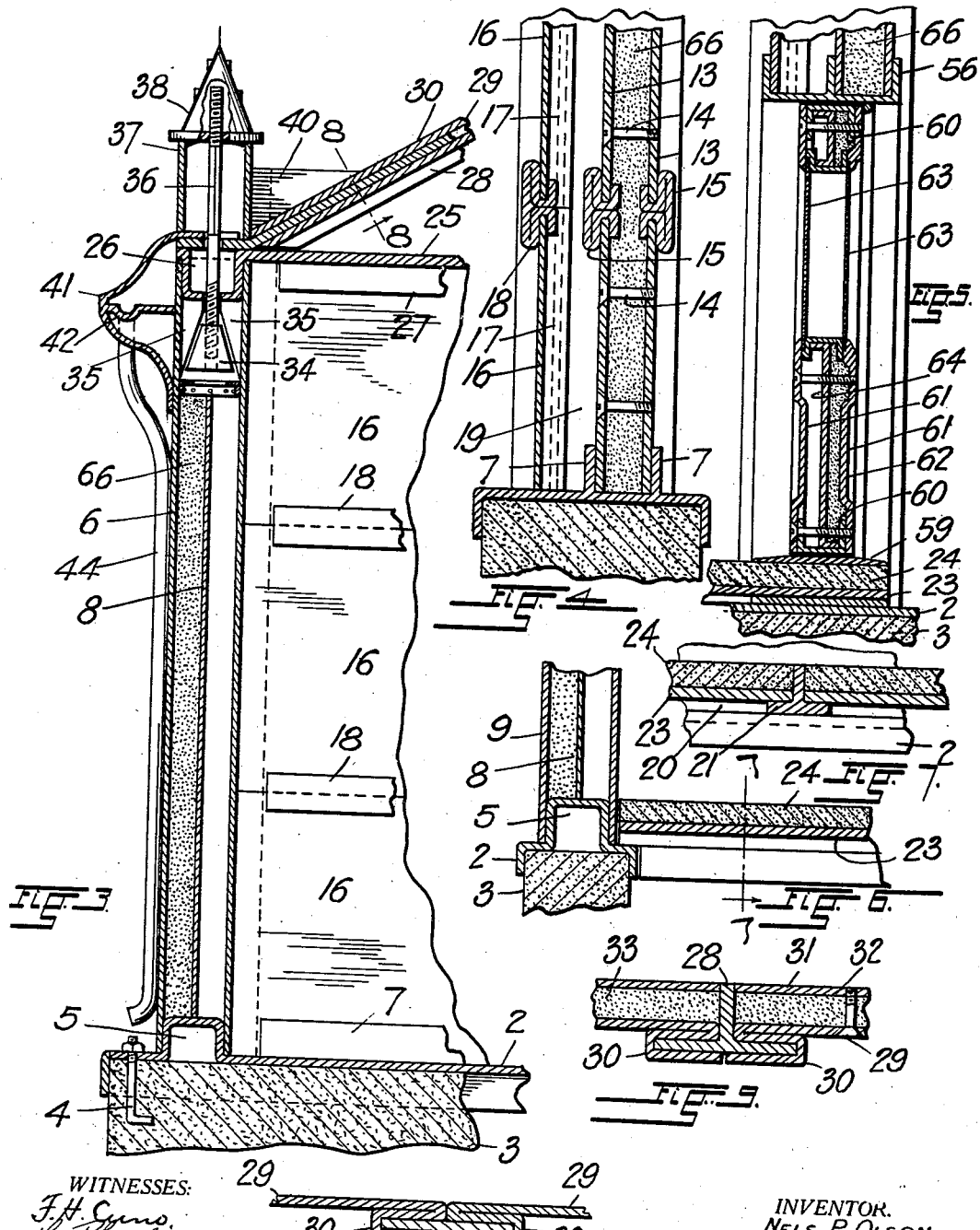

UNITED STATES PATENT OFFICE.

NELS P. OLSON, OF DENVER, COLORADO.

METALLIC BUILDING CONSTRUCTION.

1,284,758.     Specification of Letters Patent.     Patented Nov. 12, 1918.

Application filed April 21, 1914, Serial No. 833,405. Renewed April 4, 1918. Serial No. 226,783.

*To all whom it may concern:*

Be it known that I, NELS P. OLSON, a subject of Gustav V, King of Sweden, and having declared my intention of becoming a citizen of the United States, residing at Denver, in the county of Denver and State of Colorado, have invented certain new and useful Improvements in Metallic Building Construction, of which the following is a specification.

This invention relates to a novel building construction its primary object being to provide by the use of interlocking sections of standard form and proportions, a building entirely composed of metal, which may be readily erected without fitting of its parts and to a considerable extent without the use of tools, screws, bolts or other fastening means.

The construction of the parts of which my improved building is composed and the character of their interlocking connections, insure a structure which is strong, durable and rigid, impervious to sound, air and moisture and inexpensive in production and installation.

In the accompanying drawings in the various views of which like parts are similarly designated, Figure 1 represents a side elevation of a portion of a building constructed in accordance with my invention, partially in section, Fig. 2, a section taken along the line 2—2, Fig. 1, drawn to an enlarged scale, Fig. 3, a vertical section taken along the line 3—3, Fig. 2, Fig. 4, an enlarged section along the line 4—4, Fig. 1, Fig. 5, an enlarged section along the line 5—5, Fig. 1, Fig. 6, an enlarged section along the line 6—6, Fig. 1, Fig. 7, a section along the line 7—7, Fig. 6, Fig. 8, a section along the line 8—8, Fig. 3, Fig. 9, a section similar to Fig. 8 showing a modified construction of the roof of the building, Fig. 10, a fragmentary section taken along the line 10 10, Fig. 1.

Fig. 11, a fragmentary section showing a method of constructing a building of more than one floor, Fig. 12, a section along the line 12 12, Fig. 11, Fig. 13, a section taken along the line 13 13, Fig. 1, Fig. 14, a section along the line 14 14, Fig. 1, and Fig. 15, a section along the line 15 15, Fig. 11.

Referring to the drawings in detail, my improved building construction comprises a rectangular base 2 for the support of the walls of the building. The base which is produced in sections of any desired length, is supported upon a foundation bed 3 of concrete or other suitable material to which it is rigidly connected by means of anchor bolts 4.

The base is made of channel shaped metal to fit over the upper portion of the foundation and it is formed with upwardly projecting studs 5 of preferably rectangular section which serve to determine the position of the upright columns and aid in maintaining them in an upright position.

The base has furthermore between its studs, upwardly projecting, longitudinally extending flanges 7 which provide channels to receive the lower edges of the wall sections placed between the columns.

The columns comprised in my improved construction, which in the drawings are designated by the numerals 6 and 9, are hollow and of rectangular section and they are divided longitudinally into two compartments, by partitions 8. The columns 6 which are designed for use at the corners of the building have at two adjoining sides three parallel longitudinally extending ribs 10 one of which serves as a tongue for the attachment of the sections which form the inner parts of the walls of the building, while the other two provide an upright channel to receive the vertical edges of the sections comprised in the outer parts of the same.

The columns 9 which are designed for the support of the walls at points between the corners of the building, are provided at opposite sides with similar ribs 12 to provide tongues and channels for the same purpose.

The walls of my improved building are as mentioned hereinbefore, composed of two sectional parts, namely, an inner part the sections of which are secured by the tongues on the columns, and an outer part the component sections of which are held in place in the grooves of the same.

The sections comprised in the outer part of the wall are formed of adjoining members, placed one above the other and each composed of two spaced parallel plates 13 which are connected by stay-bolts 14. The lower members of the outside part of the wall are supported upon the base with their lower edges fitted in the channels of the same and with their vertical edges inserted in the channels of the columns between which they are placed.

The superposed members of the outer parts of the wall are likewise inserted in the opposed channels of the columns between which they extend, and the joints between their horizontal edges and those of the adjoining members, are closed by means of interposed connecting strips 15 which are bent and doubled to provide grooves for the reception of the edges of the plates 13 of which the wall members are composed.

The spaces between the plates of the sections assembled as described, and the outer compartments of the columns, are filled with sand as indicated at 66 in the drawings for the purpose of rendering the structure impervious to air and sound and to make the walls of the same fire proof.

The inner parts of the walls of the building are composed of single plates 16 which at their vertical edges are doubled and bent to provide grooves 17 for the reception of the tongues of the columns.

The sections of the inner wall parts placed between each two adjacent columns, may be made in one piece to extend the entire height of the building, or they may be formed like the outer wall parts, in sections which are connected at their adjoining edges by strips 18 formed with longitudinal grooves like those employed in the formation of the outer parts of the walls, as shown in Fig. 4.

The air spaces 19 between the inner and outer parts of the walls, aid in rendering the latter impervious to heat and cold.

The lower floor of the building is produced by means of a series of parallel sills 20 of T-shaped section which in an inverted position are supported at their ends upon opposite portions of the base, interiorly of the walls erected thereon.

Placed between these sills and between the outer ones and the adjacent walls of the building, are longitudinally alined tie-beams 21 of similar section which are supported upon the base plate and upon the flanges of the sills and secured to the latter by rivets, screws or bolts.

The sills and tie-beams may in buildings of large proportions be supported at their points of intersection upon piers of concrete, stone or masonry as shown at 22 in Fig. 10.

The spaces between the upright ribs of the inverted T-shaped sills and cross beams are closed by means of metal plates 23 which provide a support for a filling 24 of plastic material the surface of which is flush with the upper edges of said ribs.

The roof of a building made in accordance with my improved construction is formed by means of a top plate 25 which is the counterpart of the base plate, with the exception that in section it is straight instead of channel shaped.

The top plate is placed in an inverted position on the columns and walls of the building with its studs 26 projecting into the upper ends of the hollow columns, and with the channels formed by its ribs 27, occupied by the upper edges of the outer parts of the walls.

The rafters 28 of the roof are made of T-shaped bars which are bent at their outer ends to provide feet for their support upon the top plate 25. The rafters which are placed in parallel relation to each other preferably above the columns of the building to which they are secured by means hereinafter to be described, support the roof plates 29 which are secured between them.

The plates are to this end, bent and doubled along their edges to provide grooves 30 for the reception of the flanges of the rafters and in case they are made in sections, they may be joined at their adjoining edges by strips of the character used in connecting the members of the walls as is shown in Fig. 4.

In Fig. 9 of the drawings is shown a modified method of constructing the roof of the building. In this form the rafters are placed upon the top plate 25 of the walls in an inverted position, and in addition to the plates 29 secured to their flanges as in the first described form, plates 31 are placed flush with the upper edges of the upwardly extending ribs of the T-shaped rafters and connected with the lower plates by means of stay-bolts 32, the spaces between the plates being filled with sand, concrete or other suitable material, as indicated at 33.

The rafters are secured to the columns of the building-walls by means of wedges 34 which extend in the upper portions of the hollow columns to engage corresponding abutments 35 which are formed within the same below the portions occupied by the studs 26 on the top plate of the walls and above the upper ends of the partitions 8.

The wedges are secured to the lower ends of bolts 36 which project through openings in the feet of the respective rafters and through distance sleeves 37 which are supported upon the said feet in axial alinement with the columns.

Nuts 38 applied to the threaded, upper end of the bolts are provided to engage the upper edges of the sleeves 37 to draw the wedges into engagement with the respective abutments and thereby secure the rafters firmly to the columns.

By shaping the sleeves and nuts as shown in the drawings, a turret effect is produced which greatly enhances the artistic appearance of the building.

The sleeves 37 are provided with longitudinally extending parallel ribs 39 which form channels for the reception of the vertical edges of plates 40 which serve to provide a gutter for catching the rain water flowing off the sloping roof.

Secured against the walls of the building along their upper edges is a cornice 41 which interiorly has an eaves-trough 42 to receive the water which is discharged from the parapet-gutter through openings 43 in the plates 40.

The cornice is at its upper end held in place by a flange which extends between the feet of the rafters and the distance sleeves which are secured to the respective columns by the wedges at the ends of the bolts 36, and the lower edges of the cornice are inserted into the grooves of the connecting strips 15 which close the joints between the upper members of the outer wall parts and those immediately below the same.

A suitable conduit 44 such as is shown in Fig. 3 of the drawings, is provided to drain the eaves-gutter.

When a building is composed of more than one story, the floors of those above the ground story are constructed as shown in Figs. 11 and 12 of the drawings.

At the upper ends of the columns and the wall-sections which extend between them is supported a top plate 45 similar to that hereinbefore described, but placed in a position similar to that of the base so that its studs 46 will occupy the lower portions of column-sections 47 which are placed in axial alinement with those used in forming the walls of the ground story.

The plate 45 is held in place by means of wedges 48 which engage abutments 49 in the upper portions of the lower sections of the columns and which are attached at the lower ends of bolts 50 the threaded upper ends of which project through openings in the studs and are provided with nuts 51 which engage the upper surfaces of the same.

Ribs 52 extending from opposite sides of the plate 45 provide longitudinal channels for the reception of the edges of the outer parts of the wall portions above and below the same. Clamped between the plate 45 and the upper ends of the lower sections of the columns, are joists 53 of T-shaped section which are placed in an inverted position between opposite walls of the building.

Tie-beams 54 of similar section are placed between the joists and between the outer joists and the other walls of the building as in the construction of the ground floor hereinbefore described, and plates 55 placed upon the flanges of the joists and the tie-beams, between the upright ribs of the same, provide a support for a filling 56 of concrete, the surface of which is flush with the upper edges of the said ribs.

For the provision of windows and doors, openings are cut in the walls of the building and lined by means of frames as in the ordinary building construction. The window frames are as shown in Fig. 13, composed of metal parts 56 which are ribbed exteriorly to provide channels for the reception of the edges of the wall around the openings in which the frames are placed.

The frames may be composed of two, three or four parts and are secured in place by means of bolts or screws driven through its ribs and the parts of the walls covered thereby.

The window sashes designated in the drawings by the numeral 57, are likewise made of metal and they are held in place as usual, by stops 58 applied on the sides of the frames.

The door frames shown in Fig. 5 of the drawings are constructed similar to the window frames, with the exception that the lower transverse parts thereof are omitted and replaced by sill plates 59 secured upon the floors of the building.

The doors are made of a frame 60 which is connected by means of bolts or screws between two plates 61 which may be shaped to represent panels as indicated at 62, or which may be provided with openings for the insertion of panes of glass, as shown at 63.

The paneled portions of the doors may be reinforced by plates 64 placed between the outer plates.

The inner surfaces of the walls of the building may be finished in any desired manner, either for the application of wall paper, or for painting, calcimining or wainscoting. Strips 65 shown in Fig. 2 of the drawings, if applied upon the inner surfaces of the walls along the edges of the columns, windows, door frames, connecting strips and floors, will conceal the joints between the parts and at the same time produce an artistic panel effect.

The outer surfaces of the walls may be finished by painting, sanding or cementing, to represent brick, stone or any other material usually used in the construction of residences and other buildings.

While I have limited my description to one wall of the building and have shown in the drawings a building of rectangular form, it will be understood that by modifications in the proportions of the parts of which the building is composed, structures of every possible shape and size may be constructed by the assemblage of parts of standard form made in accordance with my invention.

Having thus described my invention what I claim and desire to secure by Letters-Patent is:

1. In a metallic building construction, a base-plate having upwardly projecting studs, and between them a longitudinal channel and a therewith parallel tongue, columns fitted over said studs and having exteriorly, channels and tongues registering respectively with the channel and the tongue on the base plate, the said columns being composed of upper and lower sections, a plate between said sections having studs extending into one of the sections and at its opposite sides, longitudinal channels and tongues registering respectively with the channels and the tongues on the upper and lower sections of the columns, means associated with the said plate for holding the sections of the columns in axial alinement, a plate supported upon the columns, having studs extending into the upper ends of their upper sections, and between its studs a channel and a tongue registering respectively with the channels and the tongues on the upper sections, and a sectional wall composed of members slidingly fitted in the registering channels, and members having marginal grooves to slidingly receive the registering tongues.

2. In a metallic building construction, a base-plate having upwardly projecting studs, and between them a longitudinal channel, columns fitted over said studs and having exteriorly, channels registering with the channel on the base-plate, the said columns being composed of upper and lower sections, a plate between said sections having studs extending into one of the sections and at its opposite sides, longitudinal channels registering respectively with the channels on the upper and lower sections of the columns, means associated with the said plate for holding the sections of the columns in axial alinement, a plate supported upon the columns, having studs extending into the upper ends of their upper sections, and between its studs, a channel registering with the channels on the upper sections, and a sectional wall composed of members slidingly fitted in the registering channels.

3. In metallic building construction, a column composed of axially alined sections one of which is provided, interiorly, with convergent abutments, a supporting member extending between said sections and having an apertured stud fitted in one of them, a bolt projecting through the aperture of the stud and having a wedge-shaped head engaging said abutments, and a nut on said bolt for drawing its head into engagement with said abutments by contact with a relatively fixed part.

4. In metallic building construction, a base plate, columns erected thereon and provided with longitudinal channels and tongues, a wall supported on said base plate and composed of a member fitted in said channels, and a member having grooves in which said tongues are fitted, and a top fitted over the upper edges of the members of the wall.

5. In metallic building construction, a base plate having a longitudinal channel, columns erected on said base-plate and having longitudinal channels registering with the channel of the same, and longitudinal tongues, a wall supported on the base-plate and composed of a member fitted in the channels of the columns and the plate, and a member having marginal grooves in which said tongues are fitted, and a top fitted over the upper edges of the members of the wall.

6. In metallic building construction, a base plate, columns supported thereon and composed of longitudinally alined sections, a wall supported on the base and fitted between said columns, said wall being composed of sections corresponding with those of the columns, a plate disposed between the sections of the columns and the walls and fitted over the adjoining edges of the wall-sections, joists having their ends between the column-sections, and means coöperating with said plate and said joists for securing the column-sections in vertical alinement.

In testimony whereof I have affixed my signature in presence of two witnesses.

NELS P. OLSON.

Witnesses:
  G. J. ROLLANDET,
  L. RHOADES.